H. F. MILLIGAN.
BREAST EVACUATOR.
APPLICATION FILED AUG. 15, 1910.
986,738.
Patented Mar. 14, 1911.
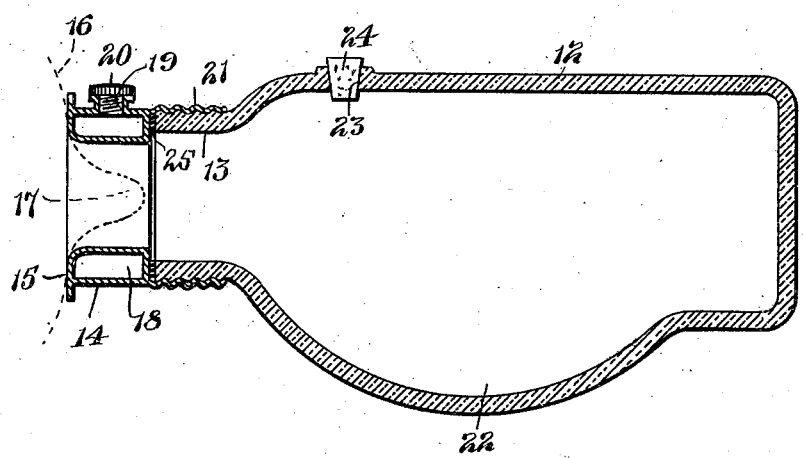

UNITED STATES PATENT OFFICE.

HATTIE FERNALD MILLIGAN, OF CAMBRIDGE, MASSACHUSETTS.

BREAST-EVACUATOR.

986,738.

Specification of Letters Patent.  Patented Mar. 14, 1911.

Application filed August 15, 1910. Serial No. 577,238.

*To all whom it may concern:*

Be it known that I, HATTIE FERNALD MILLIGAN, of Cambridge, in the county of Middlesex and State of Massachusetts, have invented certain new and useful Improvements in Breast-Evacuators, of which the following is a specification.

This invention has for its object to provide an appliance for slowly, continuously and gently drawing milk from the human breast without causing discomfort or injury.

When a receptacle composed of heat-conducting material is heated and while heated and containing air is hermetically closed, the radiation of heat from the receptacle causes a contraction of the air therein and the formation of a partial vacuum. This vacuum is utilized to withdraw milk from the breast, a receptacle being employed adapted to be closed against the admission of air by contact with the portion of a human breast surrounding a nipple, so that when the receptacle containing air is applied in a heated condition to the breast, the vacuum caused by the radiation of heat draws the milk slowly, continuously and gently from the breast, the milk being accumulated in the receptacle. To prevent the heat of the receptacle from being conducted to the flesh and causing injury and discomfort, I provide the receptacle with a heat-absorbing or insulating guard which is interposed between the portion of the appliance bearing on the breast and the heated body of the receptacle, and prevents the heating of said bearing portion during the operation.

The accompanying drawing which forms a part of this specification, represents a sectional view of an appliance embodying my invention.

In the drawings, 12 represents a receptacle preferably of glass, although any other suitable heat-conducting rigid material such as porcelain, hard rubber, etc., may be employed, it being necessary that the walls of the receptacle be capable of withstanding external atmospheric pressure when a partial vacuum is formed within it. The receptacle is provided with a milk inlet here shown as a contracted neck 13.

14 represents an extension of the milk inlet, having an annular bearing face 15, formed to have an air tight bearing on the portion of a human breast 16, surrounding a nipple 17, the construction being such that when the appliance is in use and the face 15 pressed against the breast, air can neither enter nor leave the receptacle, and the face 15 is the only part of the receptacle that is in contact with the flesh. The extension as here shown is a double walled metallic casing containing an annular chamber 18 and having an inlet 19 whereby the chamber may be filled with a cooling and heat-absorbing medium such as cold water, said inlet preferably having a closure 20, to retain the charge. The water thus introduced is interposed between the bearing face 15, and the heated body of the receptacle, and between said body and the inner wall of the extension, and constitutes a heat-insulating means, preventing the conduction of heat from said body to the said bearing face and inner wall, so that no pain or discomfort is caused by the contact of the bearing face with the nipple and the tender and sensitive skin surrounding the nipple. The extension is shown as provided with a screw-threaded flange 21, engaged with a screw-thread formed on the neck or inlet 13, and forming an air-tight joint therewith, a suitable packing ring or gasket 25, being employed, which may serve to some extent as a heat-insulator.

The receptacle may be of any suitable form and is preferably bulged at one side to form a milk-collecting cup 22, which is below the level of the milk inlet when the receptacle is held horizontally, the exterior of the bulged side being adapted to be so engaged with the operator's hand that the guard may be conveniently pressed thereby against the breast.

Before using the described appliance, the body of the receptacle is heated, preferably by filling it with hot water. After the water has been discharged, the extension 14, which has been previously charged with cold water, is attached by the screw-threaded flange 21 to the inlet 13, and then, while the body of the receptacle is hot, the face 15 of the extension is pressed against the breast. The subsequent radiation of heat from the conducting body of the receptacle forms a partial vacuum therein and causes a slow, continuous and gentle withdrawal of milk from the breast, the heat-insulating means interposed between the heated body of the receptacle and the bearing face 15 preventing the heat of the receptacle from being conducted to the breast.

It has been found that practically all the milk may be withdrawn from a single breast by one operation, occupying usually about a half hour, without the slightest pain or discomfort to the patient, a receptacle having a total holding capacity of about one quart being used.

The receptacle is preferably provided with an air inlet 23, having an air tight closure 24, which may be a compressible stopper. When the closure is removed, air is admitted to the receptacle, breaking the vacuum, and permitting the gentle removal of the receptacle from the breast.

I claim:

1. A breast evacuator comprising a rigid receptacle made of heat-conducting or radiating material, said receptacle having a milk inlet, a bearing face surrounding said inlet and formed to have an air tight bearing on the portion of a human breast surrounding a nipple, whereby the receptacle may be closed by the breast and nipple to cause the radiation of heat from the receptacle to form a partial vacuum therein and draw milk through the nipple, the receptacle being heated prior to its application to the breast, and heat-insulating means surrounding the milk inlet and interposed between the bearing face and the heat-conducting body of the receptacle, whereby the heating of said face is prevented.

2. A breast evacuator comprising a rigid receptacle made of heat-conducting or radiating material, said receptacle having a milk inlet, a bearing face surrounding said inlet and formed to have an air tight bearing on the portion of a human breast surounding a nipple, whereby the receptacle may be closed by the breast and nipple to cause the radiation of heat from the receptacle to form a partial vacuum therein and draw milk through the nipple, the receptacle being heated prior to its application to the breast, and a double walled casing forming an extension of the milk inlet and adapted to receive a cooling medium and to surround a nipple, the outer end of said extension having an annular face adapted to have an air tight bearing on the breast around the nipple, and insulated by the contents of the casing against heat from the body of the receptacle.

In testimony whereof I have affixed my signature, in presence of two witnesses.

HATTIE FERNALD MILLIGAN.

Witnesses:
EDWIN C. BROOKS,
HENRY L. LINCOLN.

---

Copies of this patent may be obtained for five cents each, by addressing the "Commissioner of Patents, Washington, D. C."